United States Patent

[11] 3,567,157

| [72] | Inventor | Paul J. Dancik<br>Broomall, Pa. |
|---|---|---|
| [21] | Appl. No. | 798,842 |
| [22] | Filed | Dec. 11, 1968<br>Division of Ser. No. 606,310, Dec. 30, 1966,<br>Pat. No. 3,439,888 |
| [45] | Patented | Mar. 2, 1971 |
| [73] | Assignee | The Boeing Company<br>Seattle, Wash. |

[54] AIRCRAFT PROPULSION MOUNTING ARRANGEMENT
10 Claims, 10 Drawing Figs.

[52] U.S. Cl. .................................................. 244/7,
244/12, 244/56
[51] Int. Cl. ........................................................B64c 29/00,
B64c 27/28
[50] Field of Search........................................... 244/7, 7.3,
12 (A), 48, 56

[56] References Cited
UNITED STATES PATENTS

| 2,007,319 | 7/1935 | Wurth | 244/56X |
| 2,673,695 | 3/1954 | Perry | 244/7(.3) |
| 2,708,081 | 5/1955 | Dobson | 244/7(.3) |

FOREIGN PATENTS

| 210,951 | 11/1940 | Switzerland | 244/7 |

Primary Examiner—Milton Buchler
Assistant Examiner—Jeffrey L. Forman
Attorneys—Franklin J. Visek, Robert J. McDonnell and Matthew P. Lynch ABSTRACT: A V/STOL aircraft having a wing and propulsion mounting arrangement wherein a propulsion unit is secured to a rotatable wing, which wing is capable of moving between a substantially vertical position and a substantially horizontal position. The propulsion unit, in turn, is adapted to move in conjunction with the wing or relative to the wing so that the wing and the engine may ve rotated together or separately during transition from vertical to forward flight and vice versa.

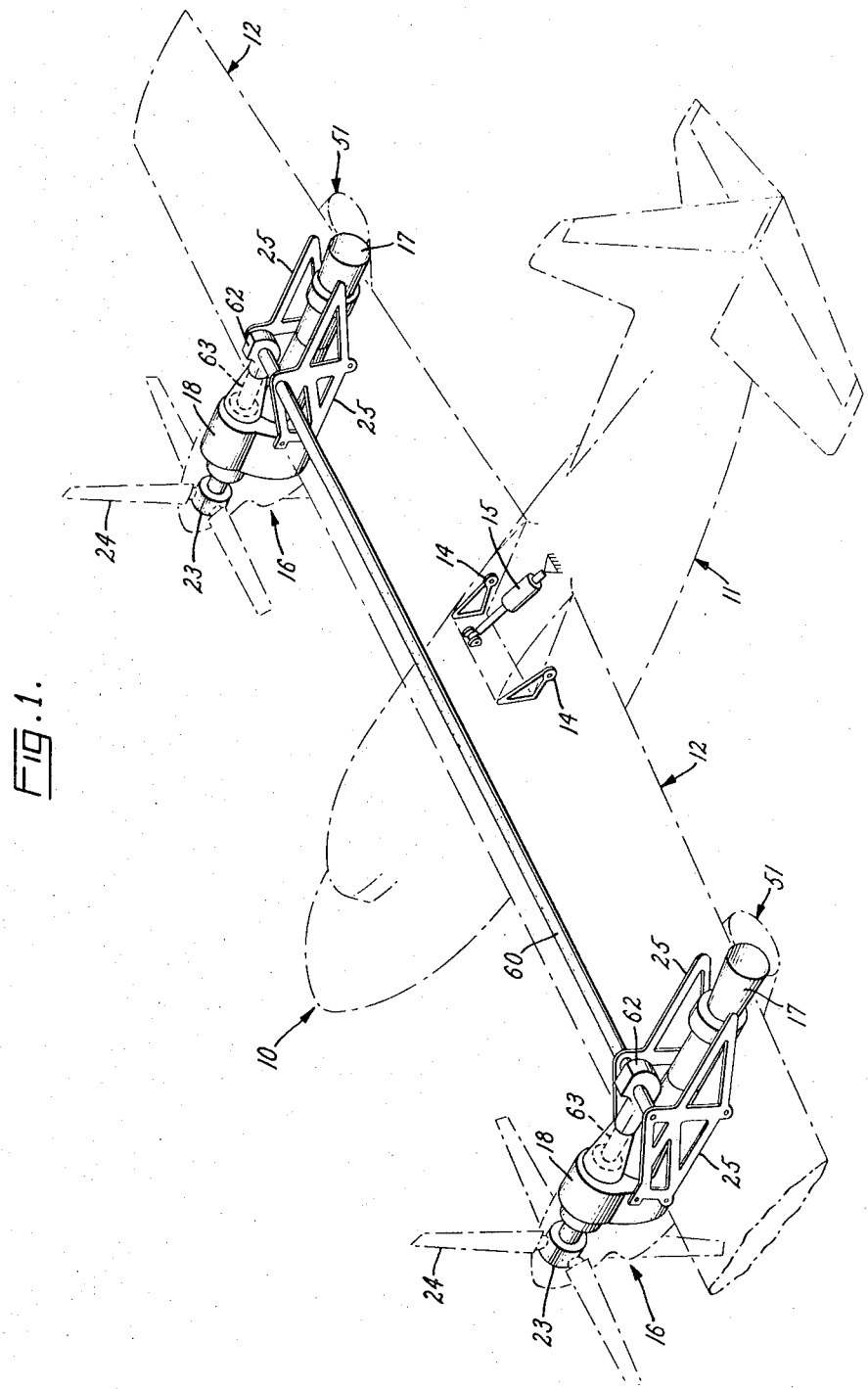

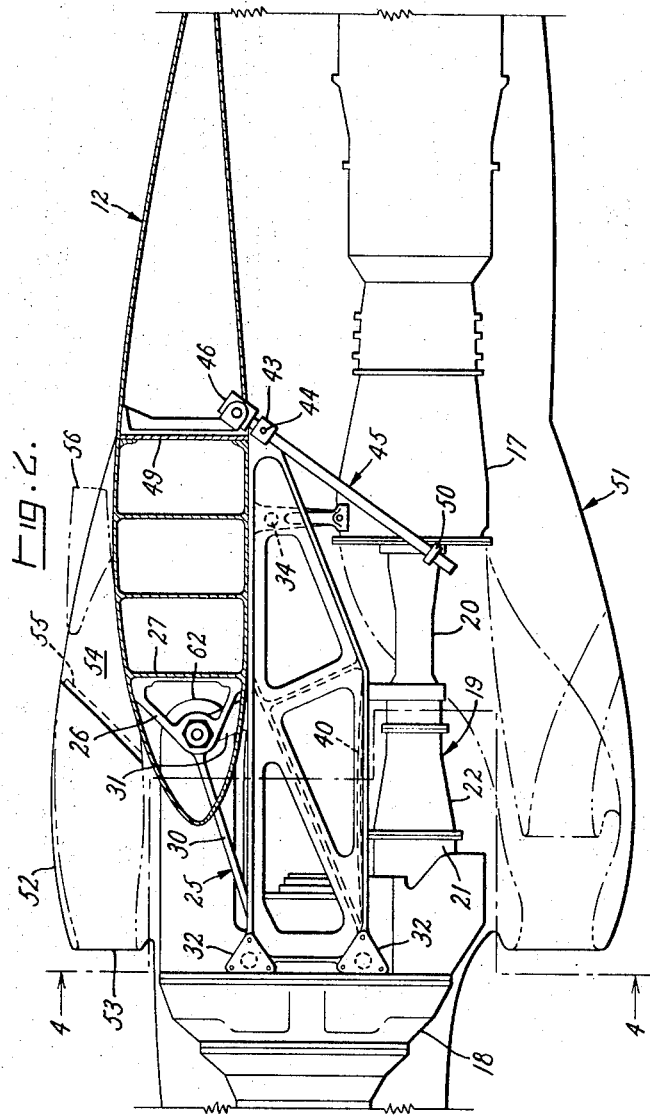
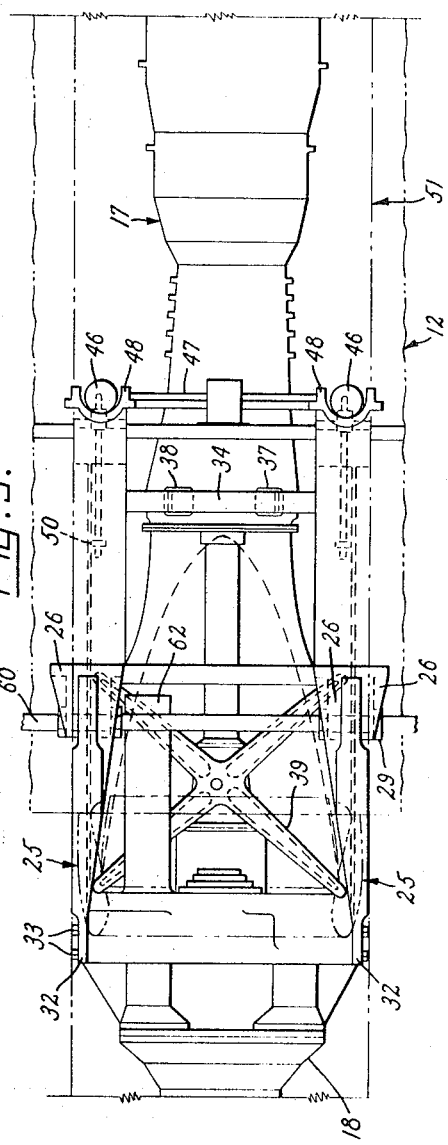
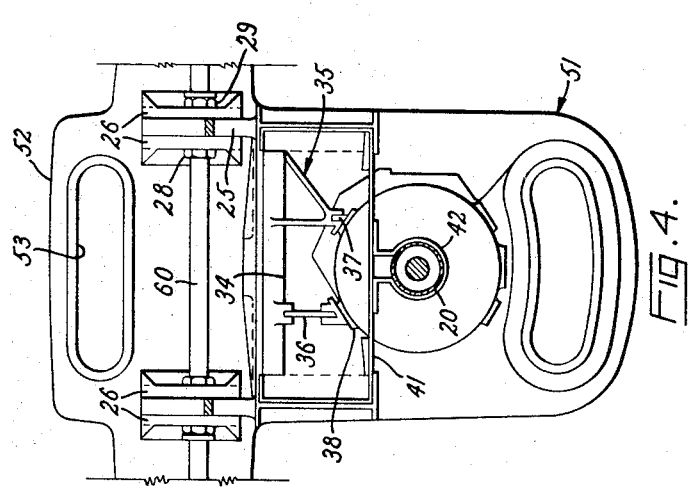
INVENTOR:
PAUL J. DANCIK,

INVENTOR:
PAUL J. DANCIK,

AIRCRAFT PROPULSION MOUNTING ARRANGEMENT

This is a division of application Ser. No. 606,310 filed Dec. 30, 1966, now U.S. Pat. No. 3,439,888.

An object of this invention is to provide an arrangement for pivotally mounting an aircraft propulsion means on the wing of an aircraft.

Another object of this invention is to provide a tilt wing aircraft having its thrust or propulsion means tiltable or movable relative to the tilt wing.

Other objects of this invention will be readily perceived from the following description, claims, and drawings.

This invention relates to a mounting arrangement for mounting propulsion means on a wing of an aircraft with the mounting arrangement comprising support means. The support means is pivotally connected to the wing by suitable means, which are disposed within the wing. The support means, which is secured to at least two spaced areas of the propulsion means by suitable means, is pivotally movable with respect to the wing about the pivotal connecting means by means connected to the wing and the support means.

This invention also relates to an aircraft having a tilt wing movable between a substantially horizontal position and a substantially vertical position. The aircraft has propulsion means and means pivotally attaching the propulsion means to the tilt wing for movement therewith. Other means pivotally move the propulsion means with respect to the tilt wing.

The attached drawings illustrate a preferred embodiment of the invention, in which:

FIG. 1 is a perspective view of a tilt wing aircraft having propulsion means attached to the wing on each side of the fuselage by the mounting arrangement of the present invention;

FIG. 2 is a side elevational view of a portion of one of the propulsion means mounted on the tilt wing of the aircraft;

FIG. 3 is a plan view of the structure of FIG. 2;

FIG. 4 is a front elevational view, partly broken away, and taken along line 4—4 of FIG. 2.

Figure 5:
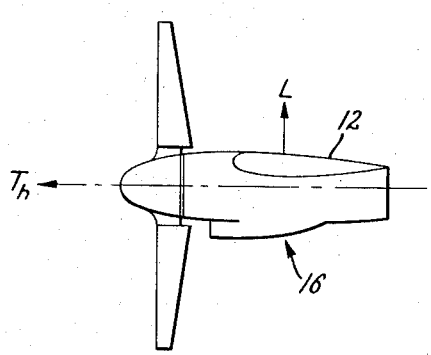
FIGS. 5 to 10 are schematic views showing the relation of the tilt wing and one of the propulsion means in various positions.

Referring to the drawings and particularly FIG. 1, there is shown an aircraft 10 with its fuselage 11 having its wing 12 tiltable relative thereto. The wing 12 is pivotally connected to the fuselage 11 by hinges 14. An actuator 15 such as a hydraulic cylinder, for example, is supported by the fuselage 11 and attached to the wing 12 to pivot the wing 12 between its horizontal and vertical positions.

The aircraft 10 has propulsion means 16 disposed on each side of the fuselage 11. Each of the propulsion means 16 is pivotally mounted on the wing 12 for providing variable directional thrust to propel the aircraft 10. While only one of the propulsion means 16 has been shown on each side of the fuselage 11, it should be understood that more than one of the propulsion means 16 could be employed on each side of the fuselage 11 if desired.

The mounting arrangement for one of the propulsion means 16 is shown in detail in FIGS. 2 to 4. The propulsion means 16 includes an engine 17 connected to a transmission 18 by a torque coupling 19. The torque coupling 19 comprises a housing 20 for the drive shaft of the engine 17 with the housing 20 secured to the engine 17, a housing 21 for the driven shaft of the transmission 18 with the housing 21 secured to the transmission 18, and an adapter housing 22. The adapter housing 22 has flanges on each end thereof for cooperation with flanges on the adjacent ends of the housings 20 and 21 whereby fasteners such as bolts and nuts, for example, connect the two flanges to each other.

A hub 23 (see FIG. 1) is supported by the transmission 18 and driven thereby. The hub 23 has a plurality of propeller or rotor blades 24 attached thereto for rotation therewith. The pitch of the blades 24 is controlled by suitable well-known pitch control mechanism (not shown) for providing both cyclic and collective pitch control of the blades 24.

The means for supporting the propulsion means 16 from the wing 12 is preferably a boxlike forging. The support means includes a pair of frame members 25, which are disposed substantially parallel to each other. Each of the frame members 25 is pivotally connected to a pair of spaced brackets 26, which are attached to front or forward spar 27 of the wing 12.

Each of the frame members 25 is pivotally connected to the spaced brackets 26 by a hollow bolt 28 and a nut 29. In order to accommodate pivotal movement of portions 30 and 31 of each of the frame members 25, the leading edge of the wing 12 has small cutout areas to permit this movement. These are the only cutout areas required in the wing 12.

The pair of frame members 25 is disposed on opposite sides of the transmission 18 (see FIG. 3). Each of the frame members 25 has a pair of vertically spaced planar mounting portions 32, which are adapted to be secured to vertically spaced portions of the transmission 18 by suitable means such as bolts 33.

The support means for the engine 17 includes a cylindrical portion 34 extending between upper portions of the frame members 25 to connect them to each other. A support bracket 35 is integral with the cylindrical portion 34 and extends downwardly therefrom as shown in FIG. 4. A support leg 36, which is spaced from the bracket 35, is pivotally connected to a pair of spaced lugs, which are integral with the cylindrical portion 34.

The support bracket 35 is pivotally connected to a mounting pad 37, which is fixed to a portion of the engine 17. The support leg 36 is pivotally attached to a mounting pad 38, which is fixed to a portion of the engine 17.

The forward part of the upper portions of the frame members 25 also are connected to each other by an X-shaped member 39 (see FIG. 3). An X-shaped member 40 (see FIG. 2), which has the same dimensions as the member 39 and is substantially parallel thereto, connects the forward portions of the bottoms of the two parallel frame members 25 to each other. The X-shaped members 39 and 40 are vertically aligned with each other.

As shown in FIG. 4, a beam 41 extends between the bottoms of the frame members 25. A U-shaped bracket 42 extends downwardly from the beam 41 and surrounds the housing 20 of the torque coupling 19 to loosely support it.

When the adapter housing 22 is disconnected from the housing 20 so that the transmission 18 may be removed for servicing, the engine 17 is still supported by the frame members 25 since the U-shaped bracket 42 supports the housing 20, which is at the front of the engine 17, and the bracket 35 and the leg 36 support the engine 17 directly.

Each of the frame members 25 has a trunnion 43 pivotally mounted thereon by a pin 44. Each of the trunnions 43 is threaded to receive a long screw 45.

Each of the screws 45 is part of an actuator 46. Each of the actuators 46 is pivotally mounted by a rod 47 to a bracket 48, which is supported to aft spar 49 of the wing 12.

The actuators 46 may be any suitable actuator such as an electric motor, for example. The actuators 46 of all of the propulsion means 16 are connected together to insure synchronized pivotal movement of the propulsion means 16 about the coaxial axes of the bolts 28.

Of course, any other suitable actuating means such as hydraulic means, for example, could be employed if desired. With other than electric motors connected to a common power source, some type of connection would be necessary between all of the actuators 46 to insure that they were all energized simultaneously so as to move each of the propulsion means 16 the same distance in the same amount of time.

When the actuators 46 are energized, the screws 45 are rotated and the trunnions 43 are moved along the threaded screws 45. As a result, the frame members 25 pivot about the axes of the bolts 28. When this occurs, the thrust axis of the propulsion means 16 is tilted with respect to the wing 12.

The amount of movement of the propulsion means 16 is limited by a stop 50 on each of the screws 45 limiting the motion of the trunnion 43 threaded on the screw 45. The stops 50 are fixedly positioned on the screws 45 so that the maximum amount of movement of the propulsion means 16 is approximately 45° for flight operation and approximately up to 80° for maintenance and servicing purposes.

A nacelle 51 surrounds the engine 17, the transmission 18, the torque coupling 19, and the support means of the propulsion means 16. The nacelle 51 is secured by suitable means (not shown) to the frame members 25. The nacelle 51 pivots with the propulsion means 16.

As shown in FIG. 2, the nacelle 51 for the propulsion means 16 includes an upper fairing 52 having an air intake 53 to permit air to be supplied through a duct to engine and transmission oil coolers (not shown) disposed within the duct. The duct is formed in the fairing 52 and continues through a portion 54 of the wing 12.

The upper fairing 52 of the nacelle 51 has its rear edge 55 disposed inside of the portion 54 of the wing 12 so that the duct extends from the air intake 53 to an opening 56 in the portion 54. The portion 54 is streamlined to cooperate with the fairing 52 of the nacelle 51 so that a continuous, smooth streamlined surface is presented.

It should be understood that the upper fairing 52 of the nacelle 51 and correlated structure would be formed of a suitable flexible material, capable of being collapsed like an accordion, or eliminated, if high angle pivoting of the propulsion means 16 with respect to the tilt wing 12 were desired. This would be necessary to avoid engagement between the fairing 52 and the wing 12.

If maximum pivoting of the propulsion means 16 is no greater than 25°, then the fairing 52 may be formed of non-flexible material since the rear edge 55 of the fairing 52 would move to a position adjacent the wing 12 but would not engage therewith. This nonengagement would be insured by the stops 50 on the screws 45 engaging the trunnions 43 to limit the pivoting of the propulsion means 16.

As shown in FIG. 1, a shaft 60 extends between the two propulsion means 16 to synchronize movement of the blades 24 of each of the propulsion means 16 with respect to each other. The shaft 60 passes through a passage formed in the center of each of the bolts 28 so that the shaft 60 has its axis coaxial with the axis of rotation of the propulsion means 16. This arrangement of the axis of the shaft 60 with the axis of rotation of the propulsion means 16 permits pivoting of the propulsion means 16 without any addition of gears or shafting. It should be understood that the shaft 60 is rotatable with respect to the wing 12.

The shaft 60 is connected through a gear box 62, which is part of the transmission 18, to a shaft 63 of the transmission 18 of each of the propulsion means 16. This insures that there is synchronization between the blades 24 of the two propulsion means 16.

Figure 6:
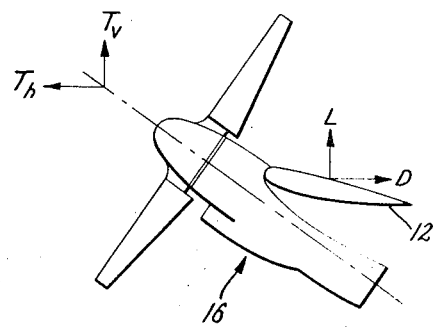

Referring to FIGS. 5 to 9, there are shown the various positions of the tilt wing 12 and the propulsion means 16 with respect to each other as the tilt wing 12 moves between its horizontal and vertical positions. FIG. 5 shows both the wing 12 and the propulsion means 16 horizontally disposed while FIG. 6 shows the wing 12 slightly moved from its horizontal position and the propulsion means 16 pivoted to a tilted relationship with respect to the wing 12.

Figure 7:
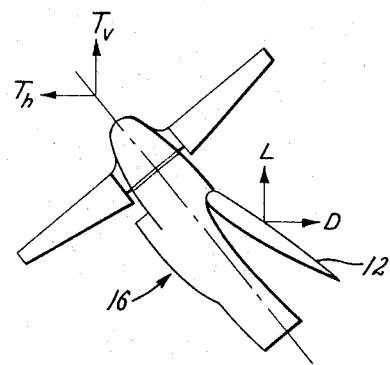
Figure 8:
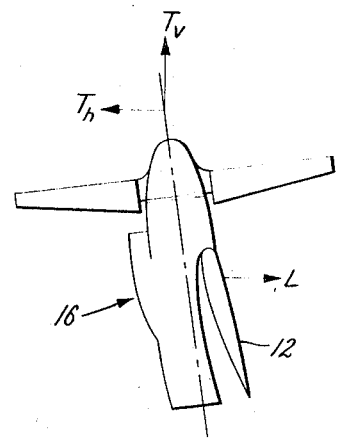
Figure 9:
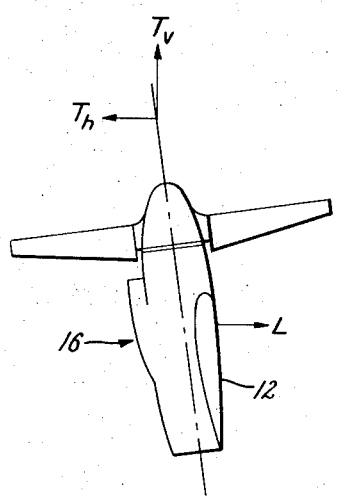

The wing 12 is shown in its transition between its horizontal and vertical positions with the propulsion means 16 still leading it by some scheduled or programmed amount in FIG. 7. FIG. 8 shows the propulsion means 16 almost vertically disposed with the tilt wing 12 still at some programmed angle with respect to the propulsion means 16. FIG. 9 shows both the tilt wing 12 and the propulsion means 16 in the almost vertical position since some $T_h$ is required to balance the lift on the wing caused by the propellar slipstream.

The propulsion means 16 has its thrust T provided as entirely a horizontal component $T_h$ or a combination of a vertical component $T_v$ and the horizontal component $T_h$ depending upon the position of the propulsion means 16. The thrust T has its components $T_v$ and $T_h$ shown in FIGS. 5 to 9.

It will be observed from FIGS. 5 to 9 that tilting of the propulsion means 16 with respect to the wing 12 results in the vertical component $T_v$ of the propeller thrust T being greater than would be available if the propulsion means 16 were not tilted. Thus, the increase in the vertical component $T_v$ of the propeller thrust T reduces the amount of lift L required from the wing 12 during transition of the wing 12 from its vertical position to its horizontal position and vice versa.

The horizontal component $T_h$ of the propeller thrust T decreases when the vertical component $T_v$ of the propeller thrust increases. However, the horizontal component $T_h$ is still sufficient to overcome the drag D that occurs during transition.

Considering the operation of the present invention for vertical takeoff, both the wing 12 and the propulsion means 16 are disposed in the almost vertical position of FIG. 9. At this time, the major component of the thrust T is its vertical component $T_v$ with a small component $T_h$ to react the wing lift L. This relation of the wing 12 and the propulsion means 16 continues until the signals pivoted from its vertical position of FIG. 9 to its horizontal position of FIG. 5 by the actuator 14.

When transition of the wing 12 from its vertical position of FIG. 9 to the horizontal position of FIG. 5 occurs, the wing 12 starts to pivot while the propulsion means 16 remains with its thrust T being substantially a vertical component $T_v$ with a small component $T_h$ (see FIG. 8). This is accomplished by pivoting the propulsion means 16 through the actuators 46 at the same time that the actuator 14 is pivoting the tilt wing 12. This results in the tilt wing 12 now leading the propulsion means 16 as the tilt wing 12 moves from its vertical position toward its horizontal position (see FIG. 7).

Prior to the wing 12 reaching its horizontal position, the propulsion means 16 is still obtaining a small amount of vertical thrust component $T_v$ from the propeller thrust T because the propulsion means 16 is still pivoted with respect to the wing 12 (see FIG. 6). When the wing 12 reaches its full horizontal position, the pivotal movement of the propulsion means 16 is completed so that the entire propeller thrust T is provided as a horizontal component $T_h$ (see FIG. 5).

When it is desired to land the tilt wing aircraft 10 by tilting the wing 12 to its vertical position from its horizontal position, the propulsion means 16 is first pivoted a programmed amount with respect to the wing 12 as a function of wing position. During movement of the wing 12 from its horizontal position towards its vertical position, the propulsion means 16 leads the tilt wing 12. This results in the propeller thrust T having a greater vertical component $T_v$ than would be available if the propulsion means 16 had not been initially pivoted with respect to the wing 12.

When the propulsion means 16 almost reaches the position in which most of its thrust T is a vertical component $T_v$, the wing 12 is still not in its vertical position (see FIG. 8). However, during the remainder of pivoting of the tilt wing 12 to its hover position, the propulsion means 16 moves to the position of FIG. 9 in which it is tilted at an angle of 8° to the vertical so that most of its propeller thrust T is a vertical component $T_v$.

Figure 10:
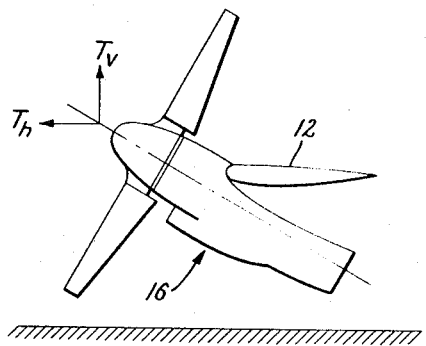

If the tilt wing 12 should be unable due to a malfunction in the wing tilt system to be tilted from the horizontal position to provide propeller tip to ground clearance, the propulsion means 16 may be tilted independently and remotely by the pilot as shown in FIG. 10. This position is also the takeoff position for STOL operation, and this position is attained whenever the landing gear is extended. When the landing gear is retracted in flight, the wing and propeller attain the relationship shown in FIG. 5. Thus, this permits the aircraft 10 of the present invention to utilize large diameter propellers and in areas where prior tilt wing aircraft could not be employed because of the lack of ground clearance between the propeller and the ground.

While the tilting of the propulsion means 16 has been specifically described with respect to the tilt wing 12, the pivotal arrangement of the propulsion means 16 on the wing 12 has utility on any aircraft. Thus, when the propulsion means 16 has been pivoted with respect to the wing 12 with the wing 12 remaining in the horizontal position, there is 360° of accessibility to the propulsion means 16. Accordingly, the mounting arrangement of the present invention permits easy servicing of both the engine 17 and the transmission 18.

Furthermore, because the U-shaped bracket 42 loosely supports the housing 20 on the engine 17, the transmission 18, the connected housing 21, and the adapter housing 22 may be completely removed from the aircraft 10 for servicing without having to remove the engine 17. Of course, this removal of the transmission 18, the connected housing 21, and the adapter housing 22 results in the U-shaped bracket 42 fully supporting the housing 20 attached to the engine 17.

It should be understood that the nacelle 51 would have to be formed of hinged or removable portions to permit access to the transmission 18, the connected housing 21, and the adapter housing 22. It also should be understood that the nacelle 51 would not be connected to any of the removable elements of the propulsion means 16 but only the frame members 25.

An advantage of this invention is that it allows independent sizing of the diameter of the propeller and the chord and span of the wing of a tilt wing aircraft. Another advantage of this invention is that it permits higher wing loading of a tilt wing aircraft and a smoother flying tilt wing aircraft. A further advantage of this invention is that it provides a secondary means for getting propeller ground clearance if the tilt wing system is inoperative. Still another advantage of this invention is that it allows the propellers of a tilt wing aircraft to have a larger diameter without compromising the wing loading whereby an increased hovering payload is obtained. A still further advantage of this invention is that it permits ready accessibility for servicing the propulsion means of an aircraft. Yet another advantage of this invention is that it permits removal of the transmission of an aircraft propulsion means without disturbing the engine or vice versa. A yet further advantage of this invention is that there is no cutout required in any spar of the wing.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. In an aircraft having a tilt wing movable between a substantially horizontal position and a substantially vertical position, propulsion means, support means secured to at least two spaced areas of said propulsion means, means pivotally attaching said support means to said tilt wing for movement therewith and means to pivotally move said support means and said propulsion means with respect to said tilt wing.

2. The aircraft according to claim 1 comprising means to limit the pivotal movement of said propulsion means and said support means with respect to said tilt wing.

3. The aircraft according to claim 1 in which said moving means is connected to said tilt wing and said support means.

4. The aircraft according to claim 3 in which said pivotal connecting means is disposed adjacent the leading edge of said wing and said moving means is disposed rearwardly of said pivotal connecting means.

5. The aircraft according to claim 1 in which said propulsion means includes an engine, a transmission, means coupling said engine to said transmission, and propelling means connected to said transmission; said securing means being attached to said transmission and at least one portion of said engine; and means attached to said support means and adapted to support said coupling means.

6. The aircraft according to claim 5 in which a nacelle encloses said engine, said transmission, said coupling means, and said support means; said nacelle cooperating with said wing to form a streamlined configuration.

7. The aircraft according to claim 5 in which said coupling means is secured at one end to said engine and is secured to said transmission at the other end and said supporting means for said coupling means is adapted to support the portion of said coupling means secured to said engine.

8. The aircraft according to claim 7 in which said supporting means for said coupling means is disposed rearwardly of said pivotal connecting means and forwardly of said moving means.

9. The aircraft according to claim 5 in which said support means comprises two substantially parallel frame members with said frame members being disposed on opposite sides of said transmission, said moving means comprising separate means connected to each of said frame members, and means connecting said separate moving means to each other to synchronize their movements.

10. The aircraft according to claim 1 in which said aircraft has at least one of said propulsion means disposed on each side of its fuselage, means connecting said propulsion means to each other, and the axis of said pivotal attaching means for each of said propulsion means being aligned with the axis of said means connecting said propulsion means to each other.